United States Patent [19]
Hirao

[11] 3,962,680
[45] June 8, 1976

[54] COMPARATOR DEVICE
[75] Inventor: Shigeharu Hirao, Yokohama, Japan
[73] Assignee: Tokyo Shibaura Electric Co., Ltd., Kawasaki, Japan
[22] Filed: Mar. 11, 1975
[21] Appl. No.: 557,249

[30] Foreign Application Priority Data
Mar. 13, 1974 Japan............................. 49-28100

[52] U.S. Cl........................... 340/146.2; 340/172.5
[51] Int. Cl.²......................................... G06F 7/02
[58] Field of Search..................... 340/146.2, 172.5; 235/177

[56] References Cited
UNITED STATES PATENTS
3,660,823  5/1972  Recks............................. 340/146.2
3,676,849  7/1972  Malandro et al. ........... 340/146.2 X
3,760,355  9/1973  Bruckert......................... 340/146.2

Primary Examiner—Jerry Smith
Attorney, Agent, or Firm—Finnegan, Henderson, Farabow & Garrett

[57] ABSTRACT

A comparator device comprising a plurality of coincidence circuits having different numbers of first input terminals supplied with the corresponding number of bit signals being compared, each having one second input terminal supplied with one of comparison base bit signals, and producing a coincidence detection signal where all the bit signals being compared have the same logical level as the comparison base bit signal; and an AND circuit for obtaining the logical product of outputs from the plural coincidence circuits, wherein the number m of the coincidence circuits is so chosen as to satisfy the relationship $$2^{m-1} \leq x \leq 2^m - 1$$

with the total number of bit signals being compared designated as $x$ ($x \geq 3$).

6 Claims, 11 Drawing Figures

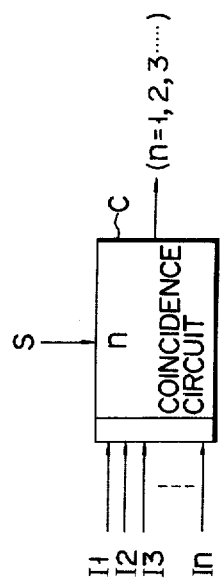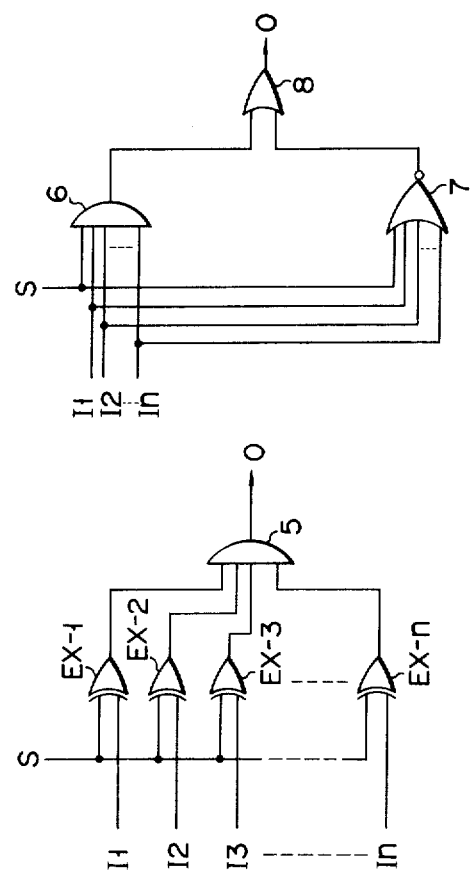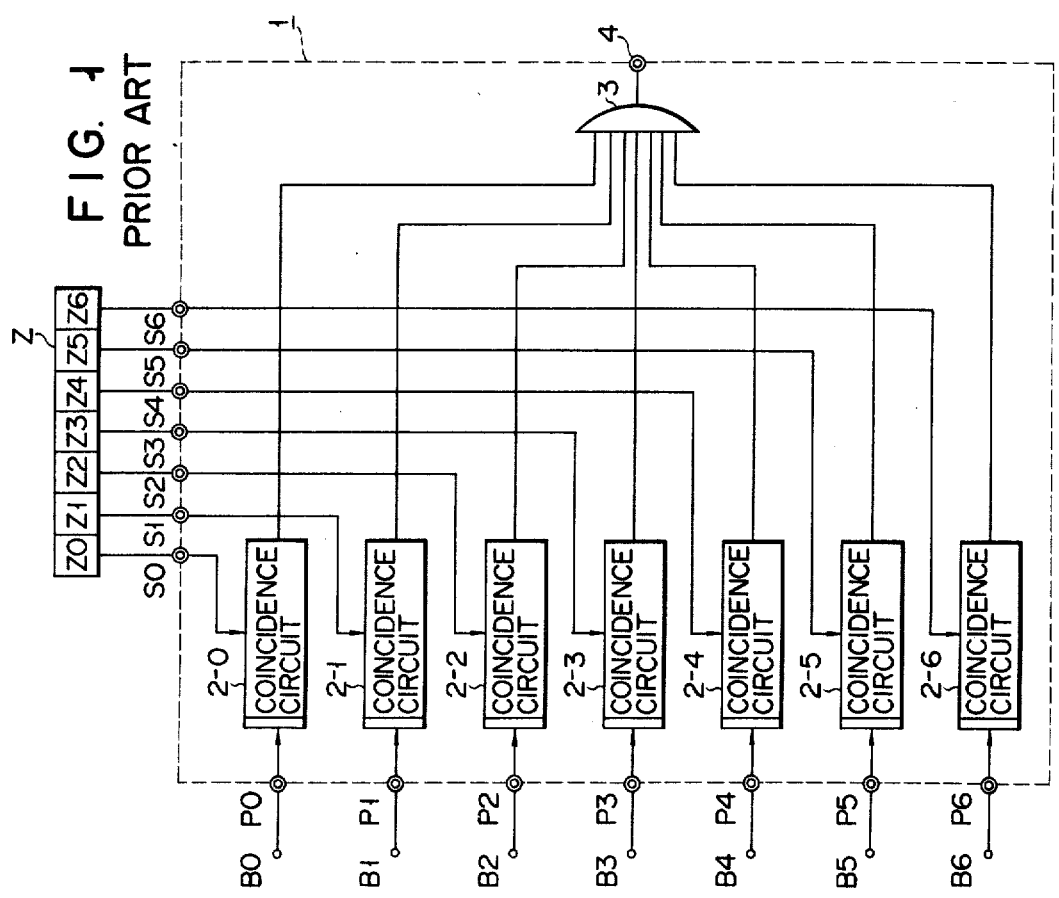

COMPARATOR DEVICE

BACKGROUND OF THE INVENTION

This invention relates to a comparator device and more particularly to a comparator device provided as a whole with fewer input terminals for comparison base bit signals than for bit signals being compared.

The prior art comparator device has an arrangement shown, for example, in FIG. 1. The section of FIG. 1 enclosed in broken lines represents a comparator device 1. With this comparator device 1, for example, seven bit signals being compared are transmitted through signal lines B0, B1, B2, B3, B4, B5, B6 to the corresponding seven input terminals P0, P1, P2, P3, P4, P5, P6. Seven input terminals of a comparison base signal S0, S1, S2, S3, S4, S5, S6 are supplied with seven bit signals Z0, Z1, Z2, Z3, Z4, Z5, Z6 collectively forming a comparison base signal Z. Namely, bit-to-bit comparison is made between bit signals being compared and comparison base bit signals. The input terminals P0 to P6 of seven bit signals being compared are connected to one input terminal each of seven coincidence circuits 2–0, 2–1, 2–2, 2–3, 2–4, 2–5, 2–6. The input terminals S0 to S6 of seven comparison base bit signals are connected to the other input terminal each of said seven coincidence circuits 2–0 to 2–6. The output terminals of the coincidence circuits 2–0 to 2–6 are connected to the corresponding input terminals of a seven input terminal-type AND circuit 3. An output signal from said AND circuit 3 is delivered to the output terminal 4 of the comparator device 1. Where the input terminal corresponding to any bit signal being compared and the corresponding input terminal of a comparison base bit signal are simultaneously supplied with a signal of the same logical level 0 or 1, then each of the coincidence circuits 2–0 to 2–6 generates a signal 1. And where said both input terminals are simultaneously supplied with bit signals of different logical levels, then the coincidence circuit gives forth a signal 0. For instance, where the bits Z0 to Z6 of the comparison base signal are chosen to have logical levels (1, 1, 1, 1, 0, 0, 0) respectively and, under this condition, the input terminals P0 to P6 of bit signals being compared are supplied with bit signals having the logical levels (1, 1, 1, 1, 0, 0, 0), then all the coincidence circuits 2–0 to 2–6 produce an output signal 1. As the result, the AND circuit 3 delivers a coincidence detection signal to the output terminal 4. On the other hand, where any of the bit signals delivered from the coincidence circuits 2–0 to 2–6 to the AND circuit 3 has a logical level 0, then said AND circuit 3 gives forth an output signal 0, showing that noncoincidence occurs between the bit signals being compared and comparison base bit signals. As mentioned above, the prior art comparator had to be provided with the same number of input terminals for comparison base bit signals as those for bit signals being compared.

However, the recent tendency is directed toward the integration or large scale integration of a comparator device to render it more compact and reliable. Since the presence of numerous terminals obstructs these forms of integration, demand is made to decrease the number of terminals as much as possible. For example, where an attempt is made to integrate the circuitry of the prior art comparator device of FIG. 1, seven input terminals for seven bit signals being compared, seven input terminals for seven comparison base bit signals and one output terminal of the comparator device, that is, fifteen terminals in all (excluding a power supply terminal) have to be taken into account. Since, the prior art comparator device needs the same number of input terminals for comparison base bit signals as those for bit signals being compared, integration of said comparator device is more handicapped as bit signals being compared increase in number.

SUMMARY OF THE INVENTION

It is accordingly the object of this invention to provide a reliable comparator device admitting of easy integration for compactness by furnishing fewer input terminals for comparison base bit signals than those for bit signals being compared, thereby decreasing the total number of terminals used with the comparator device.

The comparator device of this invention comprises an $m$ number of coincidence circuits satisfying the relationship $$2^{m-1} \leq x \leq 2^m - 1$$

with $x$ ($x \geq 3$) taken to denote the number of bit signals being compared; and one AND gate circuit supplied with output signals from said m number of coincidence circuits, wherein those of said $x$ number of bit signals being compared which have the same logical level are supplied to the input terminals of said bit signals being compared provided in the comparator device which is also supplied with comparison base bit signal having the same logical level as the bit signals being compared.

BRIEF DESCRIPTION OF THE DRAWING

FIG. 1 is a block circuit diagram of an example of the prior art comparator device;

FIG. 2A is a block diagram showing by way of illustration only one of a plurality of coincidence circuits which are supplied with an n number of bit signals being compared through the corresponding input terminals and one comparison base bit signal through the corresponding input terminal (this type of coincidence circuit is hereinafter referred to as an "n-coincidence circuit");

FIG. 2B is a block circuit diagram of an example of the n-coincidence circuit of FIG. 2A;

FIG. 2C is a block circuit diagram of another example of the n-coincidence circuit;

DESCRIPTION OF THE PREFERRED EMBODIMENTS

Figure 3:
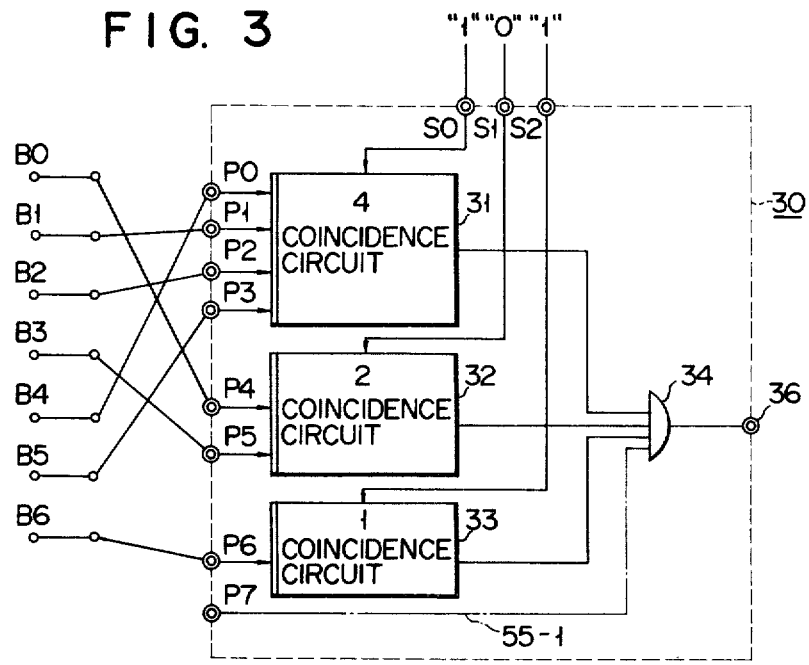
FIG. 3 is a block circuit diagram of a comparator device according to an embodiment of this invention.

There will now be described the n-coincidence circuit used with the comparator device of this invention before reference is made to the preferred embodiments thereof. The n-coincidence circuit C shown in FIG. 2A is provided with an $n(=1, 2, 3, \ldots)$ number of input terminals I1; I2; I3; . . . In corresponding to the number of bit signals being compared, one input terminal corresponding to one comparison base bit signal S and one output signal O. This n-coincidence circuit C generates, as seen from Table 1 below showing truth values, an output signal 1 where all the bit signals I1 to In, being compared, as well as the comparison base bit signal S, have a logical level 0 and also where said bit signals I1 to In, as well as the bit signal S, have a logical level 1, and in other cases gives forth an output signal 0.

Table 1

| Bit signals being compared (I1 to In) | Comparison base bit signal (S) | Logical level of output |
|---|---|---|
| "0" | "0" | "1" |
|  | "1" | "0" |
|  | "0" | "0" |
| "1" |  |  |
|  | "1" | "1" |
| Other cases than above | "0" | "0" |
|  | "1" | "0" |

While it is possible to devise various forms of coincidence circuit satisifying the logical coincidence shown in Table 1 of truth values above, the type of FIG. 2B or 2C is considered acceptable.

The circuitry of FIG. 2B is so arranged that an n number of bit signals being compared I1 to In are supplied to one input terminal each of the corresponding number of exclusive OR circuits EX-1 to EX-n and one comparison base bit signal S is supplied in common to the other input terminals of said exclusive OR circuits EX-1 to EX-n, and that output signals therefrom are supplied to the corresponding input terminals of an AND circuit 5. Since the exclusive OR circuits EX-1 to EX-n each produce an output signal 1 only when two input signals supplied thereto alike have a logical level 0 or 1, the coincidence circuit of FIG. 2B is so operated as to satisfy the logical coincidence given in Table 1 of truth values.

The coincidence circuit of FIG. 2C is so arranged that an n number of bit signals being compared I1 to In and one comparison base bit signal S are supplied to an AND circuit 6 provided with an $(n + 1)$ number of input terminals and an NOR circuit 7, and that output signals from the AND circuit 6 and NOR circuit 7 are drawn out through an OR gate 8. In this case, the AND circuit 6 generates an output signal 1 through the OR gate 8 where the bit signals I1 to In and the bit signal S all have a logical level 1. And where the bit signals I1 to In and the bit signal S all have a logical level 0, then the NOR circuit 7 produces an output signal 1 through the OR gate 8. Thus, the coincidence circuit of FIG. 2C is also operated as to satisfy the logical coincidence indicated in Table 1 of truth values.

There will now be described the embodiment of the subject comparator device shown in FIG. 3. The following description is given on the assumption that the AND circuit 34 lacks an input circuit consisting of the terminal P7 and line 55-1 of FIG. 3 and is of the 3-input type. Said terminal P7 and line 55-1 will be later detailed. According to this embodiment, the comparator device has three previously mentioned n-coincidence circuits and is adapted to handle seven bit signals being compared. Where $x$ is taken to denote 7, the value of m is determined to be 3 from the formula:

$$2^{m-1} \leq x \leq 2^m - 1$$

This means that it will be sufficient to provide three n-coincidence circuits. Since three digits capable of constituting any of the digits from 1 to 7 alone or jointly are 4-2-1, the number of input terminals for receiving the seven bit signals being compared are allotted as 4, 2 and 1 to three n-coincidence circuits 31, 32, 33 respectively. (A coincidence circuit provided with four said input terminals is referred to as a 4-coincidence circuit. Similarly, coincidence circuits provided with two and one said input terminals are designated as 2-coincidence circuit and 1-coincidence circuit respectively.) Thus the 4-coincidence circuit 31 is provided with four input terminals, P0, P1, P2, P3 for bit signals being compared, the 2-coincidence circuit with two said input terminals P4, P5 and the 1-coincidence circuit with one said input terminal P6. The three coincidence circuits 31, 32, 33 are respectively provided with input terminals S0, S1, S2 for comparison base bit signals. Output signals from these three coincidence circuits 31, 32, 33 are delivered to the corresponding input terminals of an AND circuit 34, an output signal from which is supplied to the output terminal 36 of the subject comparator device 30.

There will now be described the case where bit-to-bit comparison is made between the aforesaid seven bit signals being compared and seven comparison base bit signals. Now, let it be assumed that the seven comparison base bit signals have a bit arrangement (0, 1, 1, 0, 1, 1, 1). Where the five bit signals of said arrangement have a logical level 1 and the two bit signals thereof have a logical level 0, then the four input terminals P0, P1, P2, P3 of the 4-coincidence circuit 31 for receiving said four bit signals being compared are connected to the four units B1, B2, B4, B5 of the bit lines B0 to B6 for transmitting the bit signals being compared. The two input terminals P4, P5 of the 2-coincidence circuit 32 are connected to the bit lines B0, B3 and the input terminal P6 of the 1-coincidence circuit 33 to the line B6. On the other hand, a signal generator (not shown) supplies a signal 1 to the input terminal S0 of a comparison base bit signal provided in the 4-coincidence circuit 31 and the input terminal S2 of the comparison base bit signal provided in the 1-coincidence circuit 33, and a signal 0 to the input terminal S1 of the comparison base bit signal provided in the 2-coincidence circuit 32. When the input bit lines B0 to B6 of bit signals being compared are supplied with bit signals having the same bit arrangement (0, 1, 1, 0, 1, 1, 1) as that of comparison base bit signals, then all the coincidence circuits 31 to 33 generate an output 1, and the gate of the AND circuit 34 is opened to produce a coincidence output signal 1 at the output terminal 36 of the comparator device 30. Where comparison base bit signals have a different bit arrangement, then it is advised to vary connection between the input bit lines B0 to B6 and the input terminals P0 to P6 of bit signals being compared and accordingly change the logical level of comparison base bit signals being supplied to the corresponding input terminals S0, S1, S2. For instance, where the comparison base bit signals have a bit arrangement ( 0, 1, 1, 1, 1, 1, 1), then it is advised to connect the input bit lines B1 to B6 to the input terminals P0 to P5 and the input bit line B0 to the input terminal P6 so as to supply a bit signal 1 to the input terminals S0, S1 of the comparison base bit signals and a bit signal 0 to the input terminal S2 thereof. This procedure attains comparison between bit signals being compared and comparison base bit signals, no matter how the 1 and 0 levels of the seven comparison base signals are combined.

Figure 4:
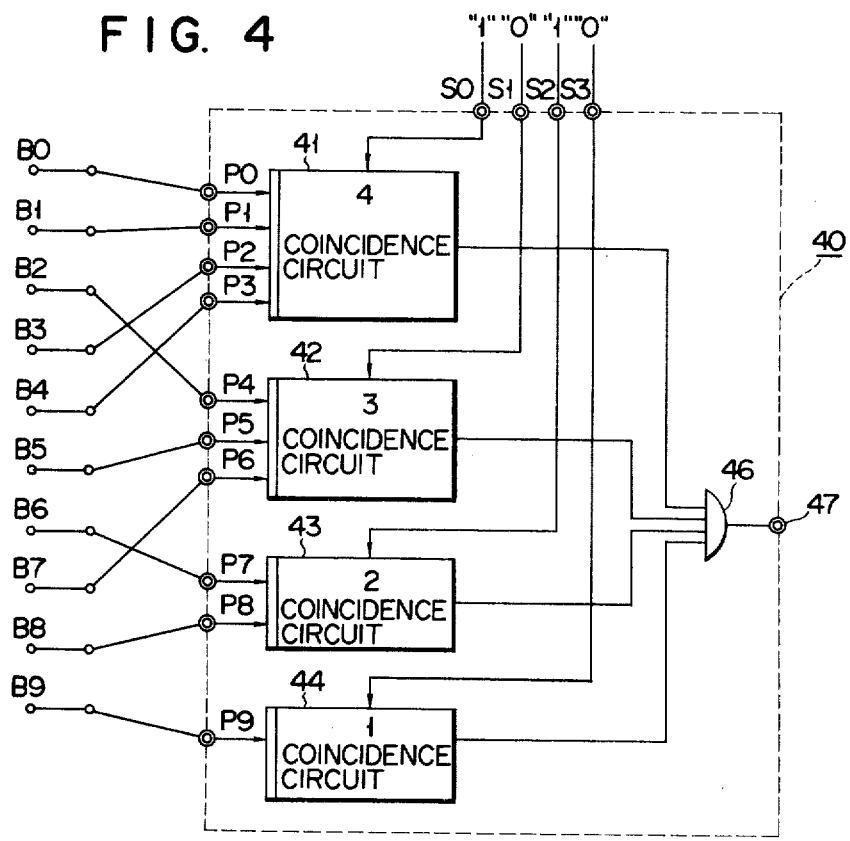
FIG. 4 is a block circuit diagram of a comparator device according to another embodiment of this invention.

FIG. 4 represents another embodiment of this invention where ten bit signals are to be compared with the proper comparison base bit signals. In this case, with $x$ included in the aforesaid formula $2^{m-1} \leq x \leq 2^m - 1$ taken to be 10, $m$ is determined to be 4. Since the digits capable of denoting any of the numerals 1 to 10 alone or jointly are 4-3-2-1, the coincidence circuits 41 to 44 are supplied with 4, 3, 2 and 1 input terminals respectively for the ten bit signals being compared. Namely, the 4-coincidence circuit 41 has four input terminals P0, P1, P2, P3 for four of the ten bit signals being compared; the 3-coincidence circuit 42 has three input terminals P4, P5, P6; the 2-coincidence circuit 43 has two input terminals P7, P8; and the 1-coincidence circuit 44 has one input terminal P9. These coincidence circuits 41 to 44 are respectively provided with input terminals S0, S1, S2, S3 for the comparison base bit signals. Output signals from said coincidence circuits are conducted to the corresponding input terminals of an AND circuit 46, an output signal from which is delivered to the output terminal 47 of the comparator device 40.

Where, in FIG. 4, comparison base bit signals have a bit arrangement (1, 1, 0, 1, 1, 0, 1, 0, 1, 0), namely, the six bit signals of this arrangement denote a logical level 1, and the four bit signals thereof represent a logical level 0, then the circuit arrangement is made as follows:

1st, 2nd, 4th, 5th input bit lines B0, B1, B3, B4 are connected to the input terminals P0, P1, P2, P3 of a signal being compared provided in the 4-coincidence circuit 41. 3rd, 6th, 8th input bit lines B2, B5, B7 are connected to the input terminals P4, P5, P6 of a signal being compared provided in the 3-coincidence circuit 42. 7th, 9th input bit lines B6, B8 are connected to the input terminals P7, P8 of a signal being compared provided in the 2-coincidence circuit 43. 10th input bit line B9 is connected to the input terminal P9 of a signal being compared provided in the 1-coincidence circuit 44.

A signal generator (not shown) supplies a signal 1 to the input terminals S0, S2 of comparison base bit signals provided in the 4- and 2-coincidence circuits 41, 43 respectively, and a signal 0 to the input terminals S1, S3 of comparison base bit signals provided in the 3-and 1-coincidence circuits 42, 44 respectively. Therefore, only when the input bit lines B0 to B9 are supplied with bit signals being compared which have the same bit arrangement (1, 1, 0, 1, 1, 0, 1, 0, 1, 0) at that of comparison base bit signals, then all the coincidence circuits 41 to 44 give forth an output signal 1, and the gate of the AND circuit 46 is opened to conduct a coincidence detection output 1 showing the result of comparison to the output terminal 47 of the comparator device 40.

Where, also in the embodiment of FIG. 4, comparison base bit signals have a different bit arrangement, then it is advised to vary connection between the input bit lines B0 to B9 of bit signals being compared and the corresponding input terminals P0 to P9 thereof and accordingly change the logical level of comparison base bit signals being supplied to the corresponding input terminals S0 to S3. This procedure attains, as in the embodiment of FIG. 3, comparison between bit signals being compared and comparison base bit signals, no matter how the logical levels 1 and 0 of the comparison base bit signals are combined.

As mentioned above, the required number of coincidence circuits is 3 for seven bit signals being compared and 4 for ten bit signals being compared. It may be generalized that where an $x$ number of bit signals are to be compared with the proper comparison base bit signals, then the required coincidence circuits should be provided in a number equal to such value of m (a positive integer) as satisfies the formula:

$$2^{m-1} \leq x \leq 2^m - 1$$

Where, however, it is previously recognized that a smaller number $j$ of bit signals being compared always take a logical level 1 among a larger number $i$ thereof, then it is unnecessary to connect the input bit lines of said 1 bit signals to the corresponding input terminals of an AND circuit through the corresponding coincidence circuits, but the input bit lines of said 1 bit signals may be directly connected to the input terminals of said AND circuit together with the output terminals of the other coincidence circuits. In this case, therefore, the number $x$ of bit signals being compared by which the required number of coincidence circuits should be determined may be expressed as follows:

$$x = i - j$$

Figure 5:
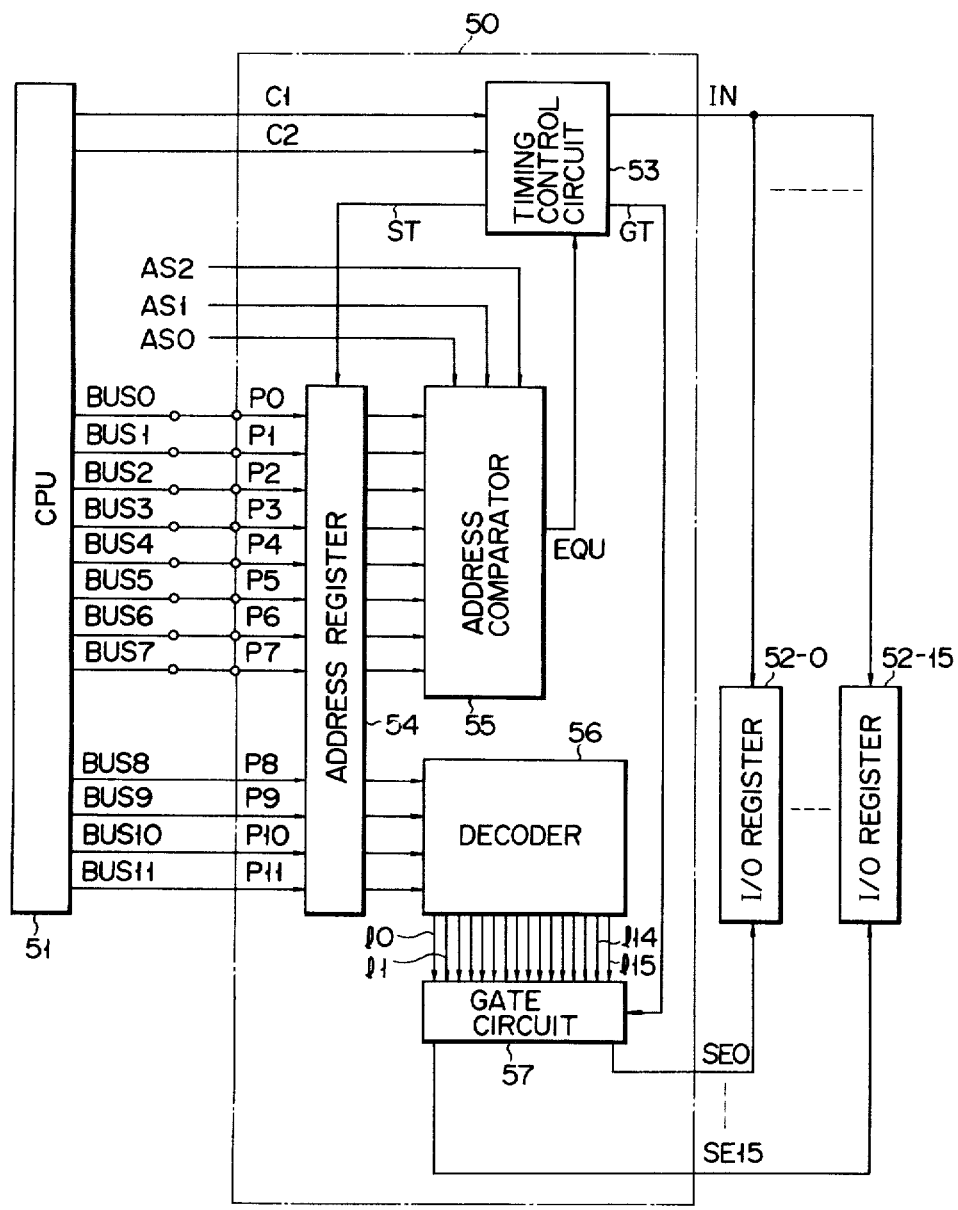
FIG. 5 is a block circuit diagram of the I/O device control unit of an electronic computer in which the comparator device of the invention is incorporated.

There will now be described by reference to FIG. 5 a circuit arrangement containing a comparator according to this invention as an address comparator. Referring to FIG. 5, a section enclosed in dot-dash lines denotes the I/O device control unit 50 of an electronic computer. This I/O device control unit 50 is disposed between the central processing unit (CPU) 51 and sixteen I/O registers 52-0 to 52-15, and comprises a timing control circuit 53, address register 54, address comparator 55, decoder 56, and gate circuit 57. Where items of address information (each consisting of twelve bits) delivered from the input terminal P0 of the address register 54 to the input terminal P11 thereof through the twelve buses BUS O to BUS 11 of the CPU 51 denote the items of address information previously allotted to the sixteen I/O registers 52-0 to 52-15, for example, the addresses 4080 to 4095, then the address comparator 55 detects the combination of the logical level 1 and 0 indicated by the first eight ones of the aforesaid twelve bits constituting each item of address information and supplies an output signal EQU to the timing control circuit 53. This timing control circuit 53 delivers a set timing signal ST to the address register 54 upon receipt of control signals C1, C2 from the CPU 51, also gives forth an operation control signal IN to set the I/O registers 52-0 to 52-15 ready for reading or writing upon receipt of control signals C1, C2 when the address comparator 55 generates an output signal EQU, and further sends a signal GT to the gate circuit 57 slightly later than the signal IN.

On the other hand, the latter four ones of the twelve bits constituting each item of address information which are delivered from the CPU 51 are carried to the decoder 56 through the BUS 8 to BUS 11. The decoder 56 decodes the essential portion of each item of address information denoted by said latter four bits and transmits an output signal 1 to any of the output lines *l*0 to *l*15 corresponding to the I/O registers 52-0 to 52-15. This 1 signal passes through the gate circuit 57 opened by the gate signal GT to the selected one of the I/O registers 52-0 to 52-15 as one of the select signals SE 0 to SE 15. Upon receipt of said select signal, the selected I/O register is operated ready for reading or writing according to the content of the operation control signal IN.

Figure 6:
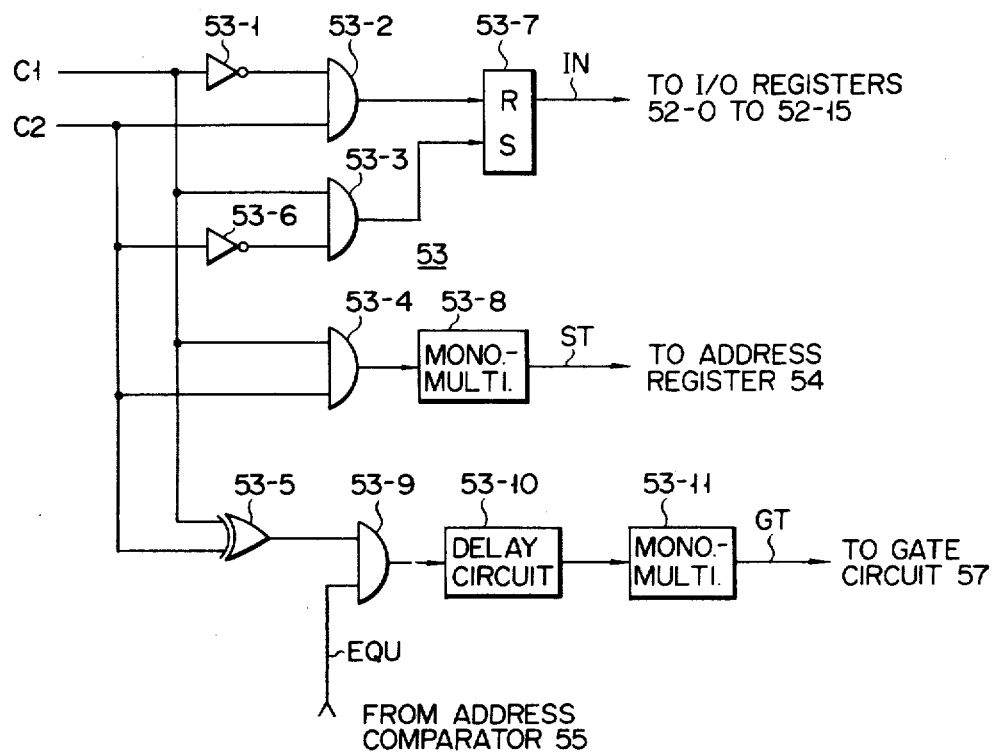
FIG. 6 is a block circuit diagram of a concrete timing control circuit arrangement included in FIG. 5.

Referring now to FIG. 6, a control signal C1 sent from the CPU 51 to the timing control circuit 53 is conducted to one of the input terminals of the AND circuit 53-2 through the inverter 53-1 and also to one input terminal each of the AND circuits 53-3, 53-4 and exclusive OR circuit 53-5. The other control signal C2 is transmitted to the other input terminal each of the AND circuits 53-1, 53-4 and exclusive OR circuit 53-5 and also to the other input terminal of the AND circuit 53-3 through the inverter 53-6. The output terminal of the AND circuit 53-2 is connected to the reset terminal of the flip-flop circuit 53-7. The output terminal of the AND circuit 53-3 is connected to the set terminal of the flip-flop circuit 53-7, the output terminal of which is connected to the I/O registers 52-0 to 52-15. The output terminal of the AND circuit 53-4 is connected to the input terminal of the monostable multivibrator 53-8, the output terminal of which is connected to the set input terminal of the address register 54. An output signal from the exclusive OR circuit 53-5, together with an EQU signal from the address comparator 55, is supplied to the input terminal of the AND circuit 53-9, an output signal from which is sent to the input terminal of the monostable multivibrator 53-11 after delayed a prescribed length of time by the delay circuit 53-10.

There will now be described by reference to FIGS. 7 and 8 the operation of the timing control circuit 53 of FIG. 6. In the case of the write mode, the control signals C1, C2 from the CPU 51 present the wave forms (a), (b) shown in FIG. 7. At the rise of the control signals C1, C2, the monostable multivibrator 53-8 is operated by an output signal from the AND circuit 53-4 to deliver a signal ST having a prescribed pulse width shown in FIG. 7(c), to the address register 54, causing address information from the CPU 51 to be stored in the address register 54. When this address information indicates any of the addresses 4080 to 4095, then the first eight ones of the twelve bits constituting said address information present a logical level 1. It will be noted that the address comparator 55 is constructed, as shown in FIG. 3, by connecting an input terminal P7 of a bit signal being compared to a line 55-1 positioned between said input terminal P7 and AND circuit 34. Since comparison base bit signals AS 0, AS 1, AS 2 supplied to the address comparator 55 are all set at a logical level 1, the gate of the AND circuit 34 is opened only when all the bit signals being compared supplied to the input terminals P0 to P6 have a logical level 1 and a bit signal brought to the input terminal P7 also has a logical level 1 thereby causing a signal EQU to be transmitted to the output terminal 36 of the comparator device of FIG. 3. Where it is expected that, for example, at least one of the light comparison base bit signals never fails to have a logical level 1, then one of the eight bit signals being compared may be delivered directly to the AND circuit 34, as indicated by a dot-dash line in FIG. 3, without being conducted through any coincidence circuit.

Figure 7:
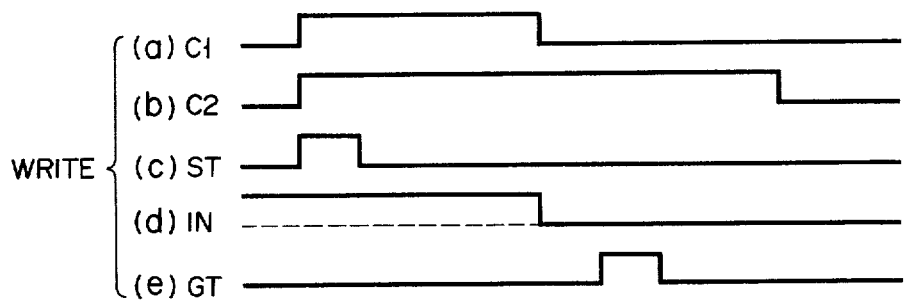
FIGS. 7 and 8 are timing charts illustrating the operation of the timing control circuit of FIG. 6.
Figure 8:
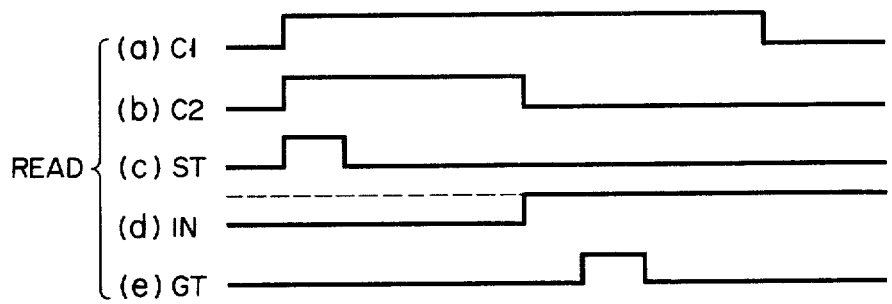

Reverting to FIG. 7, where the control signal C1 falls while the control signal C2 retains a logical level 1, then the inverter 53-1 produces an output signal 1, and the gate of the AND circuit 53-2 is opened to supply a reset signal to the flip-flop circuit 53-7. If already set at this time, the flip-flop circuit 53-7 is reset, as shown by the solid line of FIG. 7(d), to generate an output signal 0. If said flip-flop circuit 53-7 happens to remain in a reset state at that time as shown by the dashed line of FIG. 7(d), then said reset state continues. Where the input signal IN has a logical level 0, then the I/O device control unit of FIG. 5 is ready for writing. Where the exclusive OR circuit 53-5 produces an output signal 1 in response to the falling operation of the signal C1, then said signal 1 and an output signal from the address comparator 55 open the gate of the AND circuit 53-9 to deliver an output signal from said AND gate 53-9 to the delay circuit 53-10, an output signal from which operates the monostable multivibrator 53-11. This multivibrator 53-11 transmits a gate signal GT shown in FIG. 7(e) to the gate circuit 57 slightly later than the falling of the control signal C1.

In the case of the read mode, the control signals C1, C2 rise at the same time as illustrated in FIGS. 8(a) and 8(b), causing, as in the case of the write mode, a set timing signal ST shown in FIG. 8(c) to be delivered from the monostable multivibrator 53-8 to the address register 54. Where the control signal C2 falls while the control signal C1 remains in a state of 1, then the inverter 53-6 gives forth an output signal 1 and the gate of the AND circuit 53-3 is opened to set the flip-flop circuit 53-7. As the result, the signal IN presents a logical level 1 shown in FIG. 8(d) to render the timing control circuit 53 of FIG. 6 ready for reading. On the other hand, where the exclusive OR circuit 53-5 gives forth an output signal 1 at the fall of the control signal C2, then a gate signal GT shown in FIG. 8(e) is transmitted from the monostable multivibrator 53-11 to the gate circuit 57.

Figure 9:
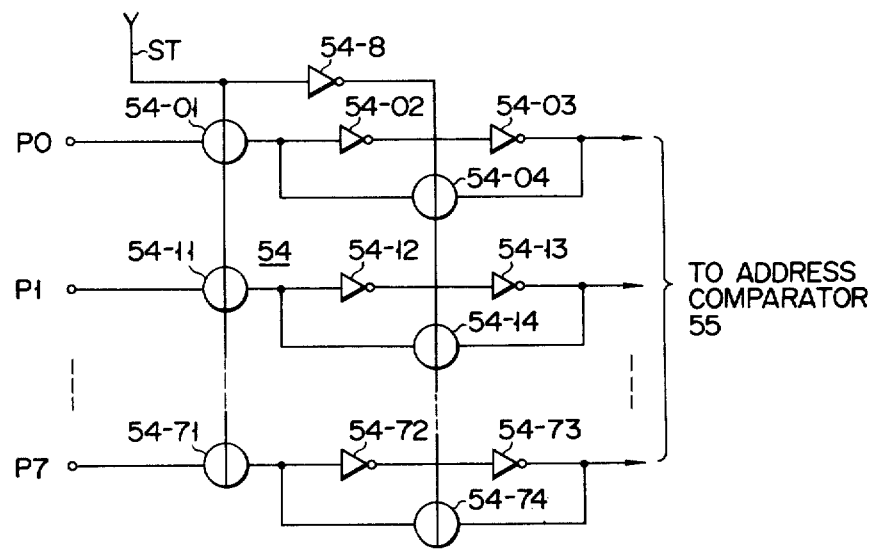
FIG. 9 is a block circuit diagram of the concrete arrangement of an address register included in FIG. 5.

The address register 54 of FIG. 5 is arranged as shown in, for example, FIG. 9. For briefness, FIG. 9 only indicates the first eight ones of the twelve bit signals constituting an item of address information. The same arrangement applies to the latter four bit signals. Referring to FIG. 9, the first eight bit signals being compared which are supplied to the corresponding input terminals P0 to P7 are delivered to the inverters 54-02, 54-12, 54-22, 54-32, 54-42, 54-52, 54-62, 54-72 and also to the inverters 54-03, 54-13, 54-23, 54-33, 54-43, 54-53, 54-63, 54-73 through the gates 54-01, 54-11, 54-21, 54-31, 54-41, 54-51, 54-61, 54-71. Output signals from said inverters 54-03, 54-13 . . . 54-73 are supplied to the address comparator 55 and also fed back to the input terminals of said inverters 54-02, 54-12, . . . 54-72 through the gates 54-04, 54-14, 54-14, 54-34, 54-44, 54-54, 54-64, 54-74. The above-mentioned gates 54-01, 54-11, . . . 54-71 are opened by a set timing signal ST from the timing control circuit 53. The aforesaid gates 54-04, 54-14, . . . 54-74 are opened by an output signal from the inverter 54-8 in the absence of a set timing signal ST. Accordingly, when supplied with the set timing signal ST, the address register 54 transmits the first eight ones of the twelve bits constituting an item of address information already received at the input terminals P0 to P7 to the address comparator 55. In the absence of the set timing signal ST, the address information is stored by circulating through a signal traveling loop consisting of the inverters 54-02, 54-03 and the gate 54-04, another signal traveling loop consisting of the inverters 54-12, 54-13 and the gate 54-14, and another signal traveling loop consisting of the inverters 54-72, 54-73 and the gate 54-74.

In the foregoing description, the addresses of the I/O registers 52-0 to 52-15 were chosen to be 4080 to 4095. However, any sixteen consecutive addresses among 16 to 4095, namely, 16P to 16P + 15 (P = 1 to 255) may well serve the purpose.

If the comparator device of this invention is applied to the address comparator of the I/O device control unit shown in FIG. 5, only three input terminals will be needed, instead of eight input terminals for comparison base bit signals as is the case with the prior art comparator device, namely, the required number of input terminals can be descreased as much as by five. This feature of the present invention attains the easy integration and large scale integration and more elevated reliability of an address comparator itself as well as of the I/O device control unit 50.

What is claimed is:

1. A comparator device comprising a plurality of coincidence circuits having first input terminals supplied with the corresponding number of bit signals being compared, each having one second input terminal supplied with one of comparison base bit signals, and producing a coincidence detection signal when all the bit signals for each coincidence circuit have the same logical level as that of the comparison base bit signals for that coincidence circuit; and an AND circuit for obtaining the logical product of outputs from the plural coincidence circuits, wherein the number $m$ of the coincidence circuits is so chosen as to satisfy the relationship $$2^{m-1} \leq x \leq 2^m - 1$$

with the total number of bit signals being compared designated as $x$ ($x \geq 3$).

2. A comparator device according to claim 1, wherein each coincidence circuit comprises a plurality of exclusive OR circuits each having two input terminals respectively connected to one of the first input terminals and the second input terminal of said coincidence circuit and an AND circuit supplied with output signals from said plural exclusive OR circuits.

3. A comparator device according to claim 1, wherein each coincidence circuit comprises an AND circuit and NOR circuit each having a plurality of input terminals, one of which is connected to the second input terminal of said coincidence circuit and the others of which are connected to the corresponding ones of the first input terminals of said coincidence circuit; and an OR circuit supplied with output signals from said last mentioned AND and NOR circuits.

4. An I/O device control unit connected between a CPU and at least one I/O register to control the reading of information from, and the writing thereof in, the I/O register, which comprises an address register stored with address information supplied from the CPU; the comparator device according to claim 1 for carrying out comparison between the bit signals constituting address information stored in the address register and the prescribed comparison base bit signals; a decoder for decoding the bit signals of address information stored in the address register; a gate circuit connected between the decoder and I/O register; and a timing control circuit for delivering a set timing signal to the address register upon receipt of a control signal from the CPU, an operation mode-designating signal to the I/O register and a gate signal to the gate circuit.

5. An I/O device control unit according to claim 4, wherein the address reigster comprises a plurality of bit units, each bit unit comprising an address information input terminal; a first gate connected to said address information input terminal and controlled by said set timing signal; first and second inverters connected in series between the output terminal of said first gate and the comparator device; a third inverter for reversing the polarity of said set timing signal; and a feedback loop including a second gate connected between the input side of the first inverter and the output side of the second inverter and designed to have its operation controlled by an output signal from the third inverter.

6. An I/O device control unit according to claim 4, wherein the timing control circuit comprises a first inverter for reversing the polarity of a first control signal from the CPU; a first AND circuit supplied with an output signal from the first inverter and a second control signal from the CPU; a second inverter for reversing the polarity of the second control signal; a second AND circuit supplied with an output signal from the second inverter and the first control signal; a flip-flop circuit reset by an output signal from the first AND circuit and set by an output signal from the second AND circuit, thereby generating an operation mode-designating signal; a third AND circuit supplied with the first and second control signals; a first monostable multivibrator driven by an output signal from said third AND circuit to give forth a set timing signal; an exclusive OR circuit supplied with said first and second control signals; a fourth AND circuit supplied with output signals from said exclusive OR circuit and said comparator device; a delay circuit for delaying the issue of an output signal from said fourth AND circuit a prescribed length of time; and a second monostable multivibrator driveri by an output signal from said delay circuit to produce said gate signal.

* * * * *